United States Patent
Gruen et al.

(10) Patent No.: US 11,263,663 B2
(45) Date of Patent: Mar. 1, 2022

(54) INTERCEPTING INADVERTENT CONVERSATIONAL DISCLOSURE OF PERSONAL INFORMATION

(71) Applicant: International Business Machines Corporation, Armonk, NY (US)

(72) Inventors: Daniel M. Gruen, Newton, MA (US); Nicola Palmarini, Boston, MA (US); Olivia Choudhury, Cambridge, MA (US); Panagiotis Karampourniotis, Cambridge, MA (US); Issa Sylla, Boston, MA (US); Morgan Foreman, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 336 days.

(21) Appl. No.: 16/509,248

(22) Filed: Jul. 11, 2019

(65) Prior Publication Data

US 2021/0012374 A1    Jan. 14, 2021

(51) Int. Cl.
*G06Q 30/02*       (2012.01)
*G06N 5/04*        (2006.01)
(Continued)

(52) U.S. Cl.
CPC ......... *G06Q 30/0248* (2013.01); *G06F 40/30* (2020.01); *G06N 5/047* (2013.01); *G06N 20/00* (2019.01)

(58) Field of Classification Search
CPC .................. G06Q 30/0248; G06Q 30/0225
See application file for complete search history.

(56) References Cited

U.S. PATENT DOCUMENTS 8,145,562 B2 *  3/2012  Wasserblat ............. G06Q 40/00
                                                      705/38
8,565,396 B1    10/2013  Oliver
                        (Continued)

OTHER PUBLICATIONS

Anonymous, "Method and System to block the garbage call by delayed answering and pre-processing automatically." IP.com Disclosure No. IPCOM000252305D, Publication Date: Jan. 4, 2018.
(Continued)

*Primary Examiner* — Azam A Ansari
(74) *Attorney, Agent, or Firm* — Garg Law Firm, PLLC; Rakesh Garg; Peter Edwards

(57) ABSTRACT

By intercepting a natural language communication of a protected party, the communication is monitored, wherein the protected party is a human being. Within the monitored communication using a natural language processing engine, a natural language interaction between the protected party and a second party is detected. To determine an interaction pattern, the natural language interaction is analyzed. The interaction pattern includes data derived from the monitored communication, metadata of the protected party, and metadata of the second party. Using the interaction pattern and an interaction behavior model, an adverse result of the natural language interaction is predicted, wherein the adverse result comprises an economic loss to the protected party. By notifying the protected party, the predicted adverse result is intercepted.

18 Claims, 9 Drawing Sheets

(51) Int. Cl.
*G06N 20/00* (2019.01)
*G06F 40/30* (2020.01)

(56) References Cited

U.S. PATENT DOCUMENTS

| | | | |
|---|---|---|---|
| 9,560,075 | B2 | 1/2017 | Goldberg et al. |
| 9,813,551 | B2* | 11/2017 | Gainsboro .......... H04M 3/4936 |
| 2014/0244476 | A1* | 8/2014 | Shvarts ................ G06Q 40/025 |
| | | | 705/38 |
| 2017/0193526 | A1* | 7/2017 | Turgeman ............ G06Q 20/401 |
| 2018/0240028 | A1* | 8/2018 | Baracaldo Angel ... G06N 20/00 |
| 2018/0255130 | A1 | 9/2018 | Kozloski et al. |
| 2019/0014064 | A1 | 1/2019 | Strauss et al. |
| 2019/0020759 | A1 | 1/2019 | Kuang |

OTHER PUBLICATIONS

Anonymous, "Spam Detection for Outgoing and Incoming Calls." IP.com Disclosure No. IPCOM000252051D, Publication Date: Dec. 14, 2017.

T. Kapourniotis et al., "Scam and fraud detection in VoIP Networks: Analysis and countermeasures using user profiling," 2011 50th FITCE Congress—"ICT: Bridging an Ever Shifting Digital Divide", Palermo, 2011, pp. 1-5.

\* cited by examiner

INTERCEPTING INADVERTENT CONVERSATIONAL DISCLOSURE OF PERSONAL INFORMATION

TECHNICAL FIELD

The present invention relates generally to a method, system, and computer program product for conversation monitoring. More particularly, the present invention relates to a method, system, and computer program product for intercepting inadvertent conversational disclosure of personal information.

BACKGROUND

Marketing of products and services is often performed via a telecommunication network (for example, by telephone) or in person (for example, by visiting a marketing target at home). Typically, the marketer initiates the communication. In a successful marketing interaction, the marketer persuades a marketing target to make a purchase, enroll in a service, enter a promotional drawing in return for providing personal or financial information, and the like. In addition, while many marketing interactions have a legitimate purpose, some are fraudulent. Non-marketing interactions can also have a fraudulent purpose, such as an attempt to obtain private information for an illegitimate reason.

SUMMARY

The illustrative embodiments provide a method, system, and computer program product. An embodiment includes a method that monitors, by intercepting a natural language communication of a protected party, the communication, wherein the protected party is a human being. An embodiment detects, within the monitored communication using a natural language processing engine, a natural language interaction between the protected party and a second party. An embodiment analyzes, to determine an interaction pattern, the natural language interaction, the interaction pattern comprising data derived from the monitored communication, metadata of the protected party, and metadata of the second party. An embodiment predicts, using the interaction pattern and an interaction behavior model, an adverse result of the natural language interaction, wherein the adverse result comprises an economic loss to the protected party. An embodiment intercepts, by notifying the protected party, the predicted adverse result.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
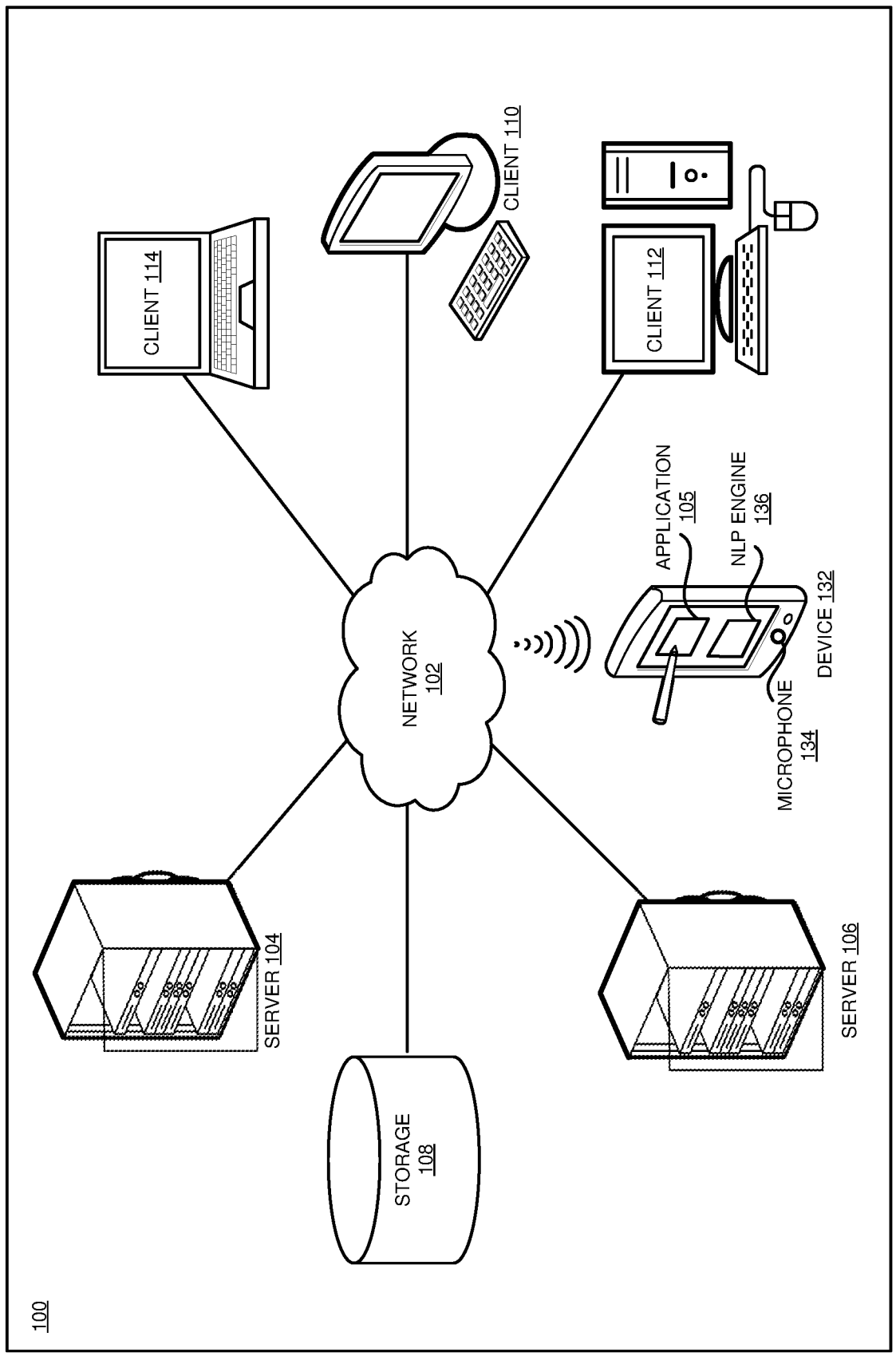
FIG. 1 depicts a block diagram of a network of data processing systems in which illustrative embodiments may be implemented.

The illustrative embodiments recognize that those responsible for the welfare of others want to protect those others from making an unneeded purchase, enrolling in an unneeded service, assenting to a potentially harmful action, or providing personal or financial information to others who should not have these types of information. For example, an elderly person or a child may not realize the imprudence of providing personal information, such as a date of birth, identification number, or bank account information, in a situation where providing such information is not actually necessary. As another example, an elderly person, a child, or a person with impaired cognition may be easily persuaded to make an unneeded purchase in response to a sales call.

As used herein, a conversation is a natural language interaction between at least two parties, a protected party and another. A protected party is a human being who, using the illustrative embodiments, is being prevented from inadvertently disclosing personal information or making an undesired commitment in conversation. The other party may be a human being or a machine. A conversation may be in voice form, text form, another form of natural language communication, or a combination of one or more forms of natural language communication. As well, a conversation may be in-person or mediated by a telecommunications network.

The illustrative embodiments recognize that there is an unmet need to monitor a protected party's conversation, predict a trend in the conversation, and intercept the conversation before inadvertent disclosure of personal information occurs.

The illustrative embodiments recognize that the presently available tools or solutions do not address these needs or provide adequate solutions for these needs. The illustrative embodiments used to describe the invention generally address and solve the above-described problems and other problems related to intercepting inadvertent conversational disclosure of personal information.

An embodiment can be implemented as a software application. The application implementing an embodiment can be configured as a modification of an existing environment monitoring or telecommunications system, as a separate application that operates in conjunction with an existing environment monitoring or telecommunications system, a standalone application, or some combination thereof.

Particularly, some illustrative embodiments provide a method for monitoring a protected party's conversation, predicting a trend in the conversation, and intercepting the conversation before inadvertent disclosure of personal information occurs.

An embodiment monitors natural language communications of a protected party by intercepting such communications. One embodiment monitors both the protected party and another party during a voice conversation over a communication network. Another embodiment monitors both the protected party and another party during a text-based conversation over a communication network. A conversation over or using a communications network is referred to herein as a network-mediated conversation. To monitor a network-mediated conversation, an embodiment uses any suitable application. Non-limiting examples of a suitable application include a telephone communications application and a text communications application.

Another embodiment monitors a protected party's environment, including both network-mediated and in-person conversations of the protected party, using any communications means the embodiment is equipped to monitor. One embodiment uses a microphone to monitor audio in the protected party's environment. For example, a voice assistant application typically includes a suitable monitoring capability because the voice assistant typically monitors a user's environment to respond to the user's voice commands. As another example, because a hearing aid can enhance audio in a user's environment, such a hearing aid could include a suitable monitoring capability. Another embodiment uses a video camera to monitor another type of communication of the protected party, for example text or sign language. One environment-monitoring embodiment only monitors the protected party's portion of a network-mediated conversation, while another environment-monitoring embodiment monitors another party to a network-mediated conversation as well as the protected party.

Within the monitored communication, an embodiment uses a natural language processing (NLP) engine to detect that a natural language interaction is occurring between the protected party and another party. To detect that a natural language interaction is occurring, an embodiment uses factors such as caller identification (for a network-mediated interaction), an identification of a voice other than the protected party's voice (for an in-person interaction monitored by a microphone), a detection of a presence of a person other than the protected party (for an in-person interaction monitored by a camera), and the like. An embodiment also converts detected speech to text, if necessary, and uses an NLP engine to determine that both the protected party and the other party are participating in the interaction.

An embodiment analyzes the natural language interaction, while it is occurring, to determine an interaction pattern. An interaction pattern includes results obtained by analyzing the natural language interaction, including data derived from the monitored communication, metadata of the protected party, and metadata of the second party. Some non-limiting examples of data derived from the monitored communication are a topic of the interaction, and one or more specific natural language phrases extracted from the interaction.

An interaction pattern also includes, if possible, an identification of the party interacting with the protected party. To identify the other party to a network-mediated interaction, an embodiment can use caller identification information such as a telephone number of a caller to the protected party and dialing information if the protected party initiated the communication. An embodiment can also match a telephone number associated with the other party with directory information such as a name associated with the other party. To identify the other party to an in-person interaction monitored by a microphone, an embodiment matches a voice monitored by the microphone with stored voice data. To identify the other party to an in-person interaction monitored by a camera, an embodiment matches a face or body monitored by the camera with stored face or body data.

An interaction pattern also includes, if possible, an interaction history of the protected party with the identified other party. For example, if the other party has called the protected party multiple times previously, each time using the same communication script, this interaction history can indicate a persistent sales caller that the protected party should not continue to interact with. On the other hand, if the other party has a telephone number matching that of the protected party's physician's office, the party's interaction with the protected party is not likely to lead to a problematic disclosure.

An embodiment includes an interaction behavior model. In one embodiment, an interaction behavior model includes a set of rules. Each entry in the set of rules includes a natural language pattern, or a natural language text that, if matched in an interaction of a protected party, could indicate that an adverse result is about to occur. An adverse result, as used herein, is a result that includes, or could lead to an economic loss to the protected party. One example of an adverse result is the purchase of an unwanted or unnecessary item or service. Another example of an adverse result is an unauthorized charge on a credit card, resulting from providing credit card information to an untrustworthy party. A third example of an adverse result is identity theft, resulting from providing personal information, such as date of birth, address, or identification number, to an untrustworthy party.

Non-limiting examples of entries in a rule set, when spoken by a protected party, are "my credit card number is", "my date of birth is", and "my bank account information is", indicating that the protected party is about to disclose the corresponding information. Additional examples of entries in a rule set, when spoken by a protected party, include the first digits of the protected party's birthdate, credit card number, or identification number, indicating that the protected party has already started to disclose the corresponding information. Non-limiting examples of entries in a rule set, when spoken by a party other than a protected party, are "What's your social?" and "How do you want to pay?", because in response to questions like these, a protected party is likely to respond with the requested information. Additional non-limiting examples of entries in a rule set, when spoken by a party other than a protected party, are "Do I have your permission to access your bank records" and "Do you agree to an ongoing subscription to our newsletter at $79 a month?" because in response to questions like these, a protected party is likely to respond with an unwise agreement.

In addition to the set of rules, an interaction behavior model includes a set of exceptions to the rules. An exception is a natural language or other pattern that represents a circumstance in which a rule, although matching an interaction of a protected party, does not apply because an adverse result is unlikely to occur.

One reason an adverse result is unlikely to occur is because the protected party is interacting with another party that is trusted, i.e. a party with which the protected party can safely interact. To implement an exception based on interactions with a trusted party, an embodiment maintains a set of identifications corresponding to trusted parties. Example identifications corresponding to a trusted party include a telephone number of a trusted party (for example, obtained using the caller ID feature of a telephone network) and a voice matching a voice sample of a trusted party (for example, obtained by monitoring an in=person interaction of a protected party).

Another reason an adverse result is unlikely to occur could be because the protected party initiated the interaction. One embodiment assumes that if a protected party initiated an interaction, the protected party intended the interaction and understands the consequences of disclosing information during the interaction. However, another embodiment recognizes that there are situations in which a protected party initiated the interaction, for example in response to an email or previous call instructing the protected party to initiate an interaction. This embodiment does not assume that if a protected party initiated the interaction an adverse result is unlikely to occur.

For example, although the example rule "my date of birth is" could result in the inappropriate disclosure of personal information if the protected party were interacting in a telephone conversation with a sales caller who had initiated the call, the same would not be the case if the protected party had initiated a call to make an appointment at a physician's office, where such information is both needed for medical records and protected from disclosure. As a result, two example exceptions to this rule might be that the protected party initiated the conversation and that the identification information for the second party to the conversation matches identification information for a trusted party.

In another embodiment, an interaction behavior model is implemented using a learning model, for example a neural network. Before being used to perform a task, a learning model must be trained to perform the task. Thus, one method of training a learning interaction behavior model of an embodiment is to supply the model with sample interactions, both those that result in a party's personal information disclosure and those that do not. During training, the model learns to recognize interaction patterns with a corresponding probability value of resulting in personal information disclosure.

An embodiment uses the interaction pattern and interaction behavior model to predict a future course of the interaction. In an embodiment using a set of rules and optional exceptions to one or more rules, an embodiment determines whether the interaction pattern is above a threshold value of matching one or more rules. For example, consider an interaction pattern including the phrase "what's your credit card number?" Here, an interaction behavior model includes a rule specifying that an interrogatory statement including a string related to payment information (e.g. "credit card"). As a result, the rule matches the interaction pattern with a value of 95 percent, above an example threshold of 75 percent.

As another example, consider an interaction pattern including the phrase "what's your date of birth?" Here, an interaction behavior model includes a rule specifying that an interrogatory statement including a string related to date of birth information (e.g. "date of birth" or "birthday"). However, the model also includes a rule specifying that if the protected party is interacting with a trusted party, the date-of-birth rule does not apply. Here, the interaction pattern includes the information that the protected party is interacting with a party having caller identification matching an entity in the set of trusted parties. As a result, although the interaction pattern matches the rule with a value of 99 percent, above an example threshold of 75 percent, the interaction pattern also matches the exception with a value of 98 percent, above an example threshold of 80 percent. As a result, the embodiment concludes that the protected party is interacting with a trusted party, and an adverse result is unlikely to result.

In an embodiment using a learning interaction behavior model, an embodiment determines whether the interaction pattern is above a threshold value of matching one or more patterns that the model has learned are likely to result in personal information disclosure. For example, for the interaction pattern including the phrase "what's your credit card number?", a learning interaction behavior model has learned that a pattern including the phrase "what's your" followed by one of several variations of strings related to payment information (e.g. "credit card") predicts an adverse result. As a result, when the learned pattern matches the interaction pattern with a value of 80 percent, above an example threshold of 65 percent, the embodiment predicts an adverse result for the interaction pattern.

As another example, for the interaction pattern including the phrase "what's your date of birth?" and the information that the protected party is interacting with a trusted party, a learning interaction behavior model has learned that a pattern including the phrase "what's your" followed by one of several variations of strings related to date of birth information (e.g. "date of birth" or "birthday"), but the protected party is interacting with a trusted party, does not predict an adverse result. As a result, when the learned pattern matches the interaction pattern with a value of 80 percent, above an example threshold of 65 percent, the embodiment does predicts an adverse result for the interaction pattern.

Thus, based on either a set of rules or a set of learned patterns, an embodiment determines a probability that an interaction pattern matches a pattern likely to result in an adverse result. If the future course of the interaction includes a result that is likely to be adverse to the protected party, an embodiment attempts to prevent the predicted result by alerting the protected party or taking another prevention or mitigation step. For example, an alert can be an audible tone or warning message, a text warning message, a visual alert such as a flashing light, or another signal or message.

An example prevention step for a network-mediated audio communication is to mute the protected party's microphone, preventing the protected party's next words from reaching the other party. An example prevention step for a network-mediated text communication is to not send the protected party's text communication, or to send the protected party's text communication only once an embodiment has determined that the text communication does not include information the protected party should not share.

An example mitigation step is to report the interaction, including any personal information the protected party disclosed, to another party responsible for the protected party, such as a caregiver or family member. Once notified, the responsible party can act to mitigate the results of the disclosure. For example, if notified that the protected party revealed credit card information, a family member could cancel the credit card, preventing future unauthorized charges. Similarly, if notified that the protected party had committed to an unneeded service, a caregiver could cancel the service, preventing future losses. Other example mitigation steps include automatically canceling a revealed credit card or unneeded service, without an intermediary.

In addition, an embodiment is configurable to explain a reason for an alert or prevention or mitigation step. For example, an embodiment alerting a protected party to an imminent text disclosure of credit card information could provide a message to the protected party, explaining that disclosing credit card information in the particular circumstances is unwise.

An embodiment uses the interaction pattern, the interaction behavior model, and any predicted or actual adverse results to identify and monitor a trend in the protected party's behavior. One example trend might be that the number of telephone calls from unknown callers a protected party answers is increasing. Another example trend might be that the lengths of a protected party's conversations with callers not a list of trusted callers are increasing. If a trend exceeds a threshold value, or is changing at more than a threshold rate, an embodiment is configurable to report the trend to another party responsible for the protected party, such as a caregiver or family member. A trend could indicate an increasing propensity to disclose personal information. A trend could also indicate a new or worsening symptom of the protected party. For example, an increasing number of long (above a threshold time) conversations with untrusted parties could be an early sign of a cognitive illness, or a worsening cognitive condition, indicating that the protected party needs additional medical attention or another form of assistance.

An embodiment also uses the interaction pattern, the interaction behavior model, and any predicted or actual adverse results to identify and monitor a trend in behavior targeting the protected party. For example, an increase in a number of sales calls to patients at a caregiving facility could indicate that the facility is a particular target for these types of calls, and that the facility should take prevention or mitigation steps. As another example, an increase in calls from a particular telephone number, a particular pattern of telephone numbers, or in calls that use a particular interaction script could also indicate a particular pattern of caller behavior.

An embodiment using a learning interaction behavior model updates the model based on an identified interaction pattern and any predicted or actual adverse results. In particular, an embodiment uses a difference between predicted and actual results for an interaction pattern to adjust the model so as to be more likely to make an accurate prediction if the same or a similar interaction pattern recurs. An embodiment also uses actual results for a previously-unknown interaction pattern to train the model to recognize such an interaction pattern.

The manner of intercepting inadvertent conversational disclosure of personal information described herein is unavailable in the presently available methods in the technological field of endeavor pertaining to natural language interaction prediction. A method of an embodiment described herein, when implemented to execute on a device or data processing system, comprises substantial advancement of the functionality of that device or data processing system in monitoring a protected party's conversation, predicting a trend in the conversation, and intercepting the conversation before inadvertent disclosure of personal information occurs.

The illustrative embodiments are described with respect to certain types of parties, patterns, interactions, trends, thresholds, predictions, responses, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
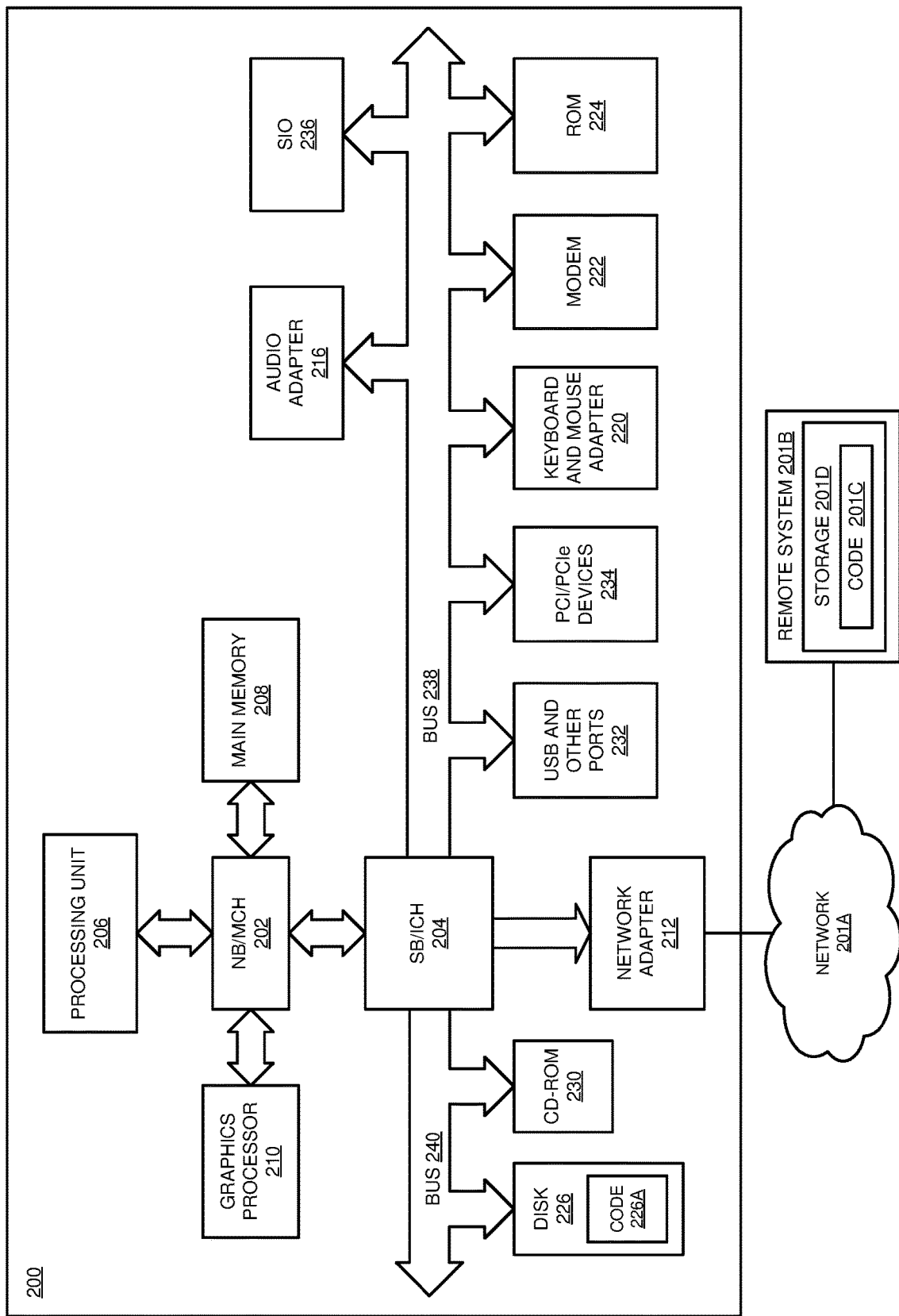
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes microphone 134.

Application 105 implements an embodiment described herein. Application 105 uses NLP engine 136. Application 105 and NLP engine 136 can execute in any of servers 104 and 106, clients 110, 112, and 114, and device 132. In addition, application 105 and NLP engine 136 need not execute in the same system. Further, application 105 makes use of any suitable monitoring sensor, for example but not limited to microphone 134, which need not be collocated with a system on which application 105 executes.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/

PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and NLP engine 136 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
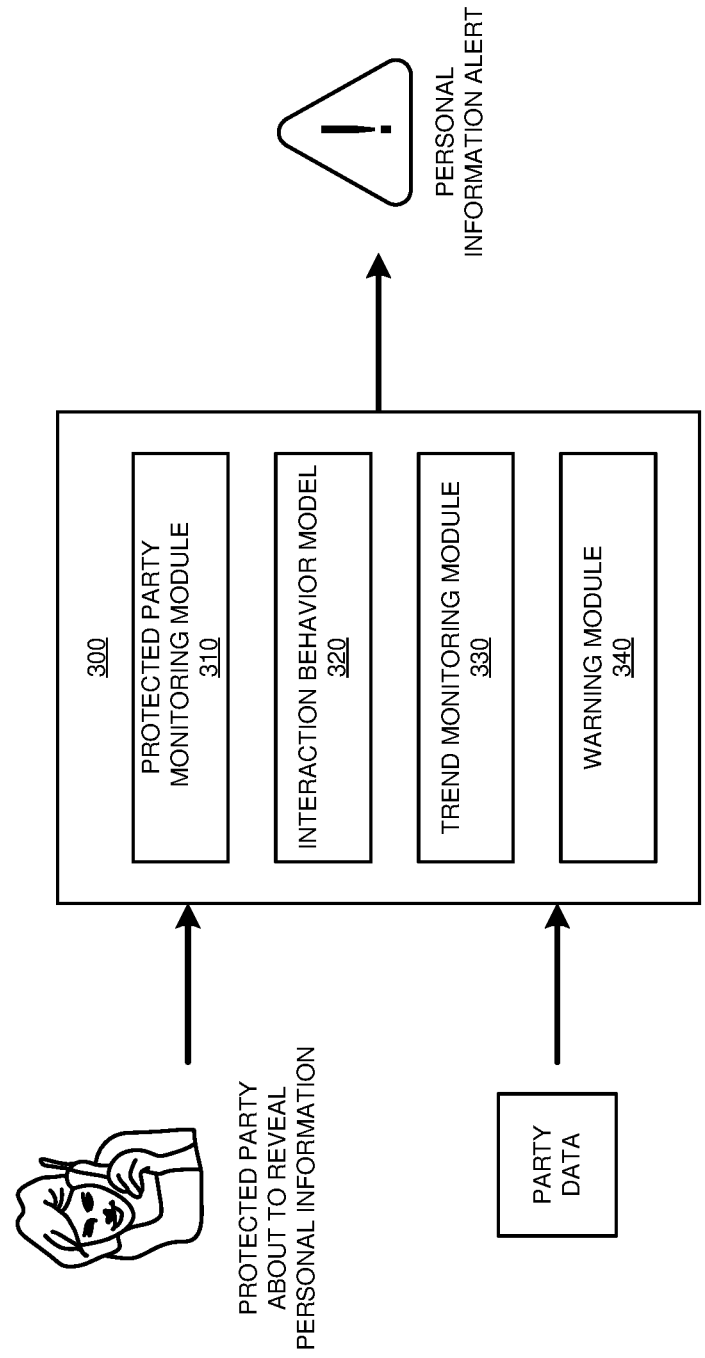
FIG. 3 depicts a block diagram of an example configuration for intercepting inadvertent conversational disclosure of personal information in accordance with an illustrative embodiment.

With reference to FIG. 3, this figure depicts a block diagram of an example configuration for intercepting inadvertent conversational disclosure of personal information in accordance with an illustrative embodiment. Application 300 is an example of application 105 in FIG. 1 and executes in any of servers 104 and 106, clients 110, 112, and 114, and device 132 in FIG. 1.

Protected party monitoring module 310 monitors natural language communications of a protected party by intercepting such communications. Module 310 is configurable to monitor both the protected party and another party during a voice or text-based conversation over a communication network, using data from an application such as a telephone communications application or a text communications application. Module 310 is also configurable to monitor a protected party's environment, including both network-mediated and in-person conversations of the protected party, using any sensor to which application 300 has access. For example, module 310 can use a microphone to monitor audio in the protected party's environment, or a video camera to monitor another type of communication of the protected party, for example text or sign language.

Within the monitored communication, module 310 uses a natural language processing (NLP) engine to detect that a natural language interaction is occurring between the protected party and another party. To detect that a natural language interaction is occurring, module 310 uses factors such as caller identification (for a network-mediated interaction), an identification of a voice other than the protected party's voice (for an in-person interaction monitored by a microphone), a detection of a presence of a person other than the protected party (for an in-person interaction monitored by a camera), and the like. An embodiment also converts detected speech to text, if necessary, and uses an NLP engine to determine that both the protected party and the other party are participating in the interaction.

Module 310 analyzes the natural language interaction, while it is occurring, to determine an interaction pattern. Module 310 uses the interaction pattern and interaction behavior model 320 to predict a future course of the interaction. One implementation of interaction behavior model 320 includes a set of rules. Each entry in the set of rules includes a natural language pattern, or a natural language text that, if matched in an interaction of a protected party, could indicate that an adverse result is about to occur. A rule-based implementation of interaction behavior model 320 also includes a set of exceptions to the rules. An exception is a circumstance in which a rule, although matching an interaction of a protected party, does not apply because an adverse result is unlikely to occur. Another implementation of interaction behavior model 320 uses a learning model, for example a neural network, that is trained to recognize interaction patterns with a corresponding probability value of resulting in personal information disclosure.

In particular, module 310 determines a probability that an interaction pattern matches a pattern likely to result in an adverse result. If the future course of the interaction includes a result that is likely to be adverse to the protected party, warning module 340 attempts to prevent the predicted result by alerting the protected party or taking another prevention or mitigation step. An alert can be an audible tone or warning message, a text warning message, a visual alert such as a flashing light, or another signal or message. One prevention step for a network-mediated audio communication mutes the protected party's microphone, preventing the protected party's next words from reaching the other party. A prevention step for a network-mediated text communication does not send the protected party's text communication, or sends the protected party's text communication only once module 340 has determined that the text communication does not include information the protected party should not share. In a mitigation step, module 340 reports the interaction, including any personal information the protected party disclosed, to another party responsible for the protected party, such as a caregiver or family member. In addition, warning module 340 is configurable to explain a reason for an alert or prevention or mitigation step. For example, an embodiment alerting a protected party to an imminent text disclosure of credit card information could provide a message to the protected party, explaining that disclosing credit card information in the particular circumstances is unwise.

Trend monitoring module 330 uses the interaction pattern, the interaction behavior model, and any predicted or actual adverse results to identify and monitor a trend in the protected party's behavior. One example trend might be that the number of telephone calls from unknown callers a protected party answers is increasing. Another example trend might be that the protected party's conversations with callers not a list of trusted callers is increasing. If a trend exceeds a threshold value, or is changing at more than a threshold rate, warning module 340 reports the trend to another party responsible for the protected party, such as a caregiver or family member. A trend could indicate an increasing propensity to disclose personal information, or a new or worsening symptom of the protected party.

Figure 4:
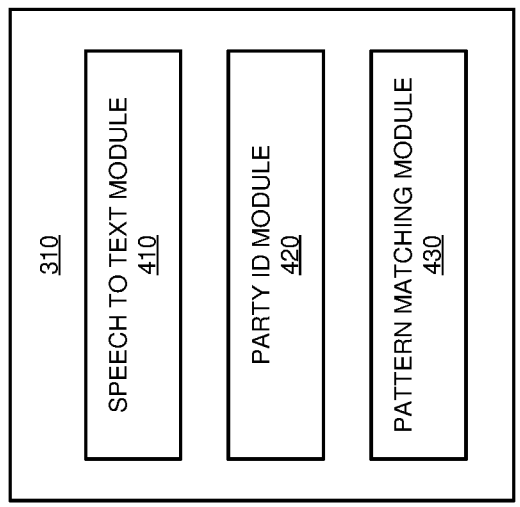
FIG. 4 depicts another block diagram of an example configuration for intercepting inadvertent conversational disclosure of personal information in accordance with an illustrative embodiment.

With reference to FIG. 4, this figure depicts another block diagram of an example configuration for intercepting inadvertent conversational disclosure of personal information in accordance with an illustrative embodiment. In particular, FIG. 4 depicts more detail of protected party monitoring module 310 in FIG. 3.

Speech to text module 410 converts speech, monitored using a microphone, to text. If application 300 is equipped with a visual monitoring capability, such as a video camera, module 410 is also configurable to convert visual information, such as American sign language, to text as well.

Party identification module 420 performs caller identification (for a network-mediated interaction), an identification of a voice other than the protected party's voice (for an in-person interaction monitored by a microphone), a detection of a presence of a person other than the protected party (for an in-person interaction monitored by a camera), and the like. To identify the other party to a network-mediated interaction, module 420 can use caller identification information such as a telephone number of a caller to the protected party and dialing information if the protected party initiated the communication. Module 420 can also match a telephone number associated with the other party with directory information such as a name associated with the other party. To identify the other party to an in-person interaction monitored by a microphone, module 420 matches a voice monitored by the microphone with stored voice data. To identify the other party to an in-person interaction monitored by a camera, module 420 matches a face or body monitored by the camera with stored face or body data.

Pattern matching module 430 analyzes the natural language interaction, while it is occurring, to determine an interaction pattern. Module 430 also uses the interaction pattern and interaction behavior model 320 to predict a future course of the interaction. In an rule-based implementation of model 320, module 430 determines whether the interaction pattern is above a threshold value of matching one or more rules. In a learning model based implementation of model 320, module 430 determines whether the interaction pattern is above a threshold value of matching one or more patterns that the model has learned are likely to result in personal information disclosure.

Figure 5:
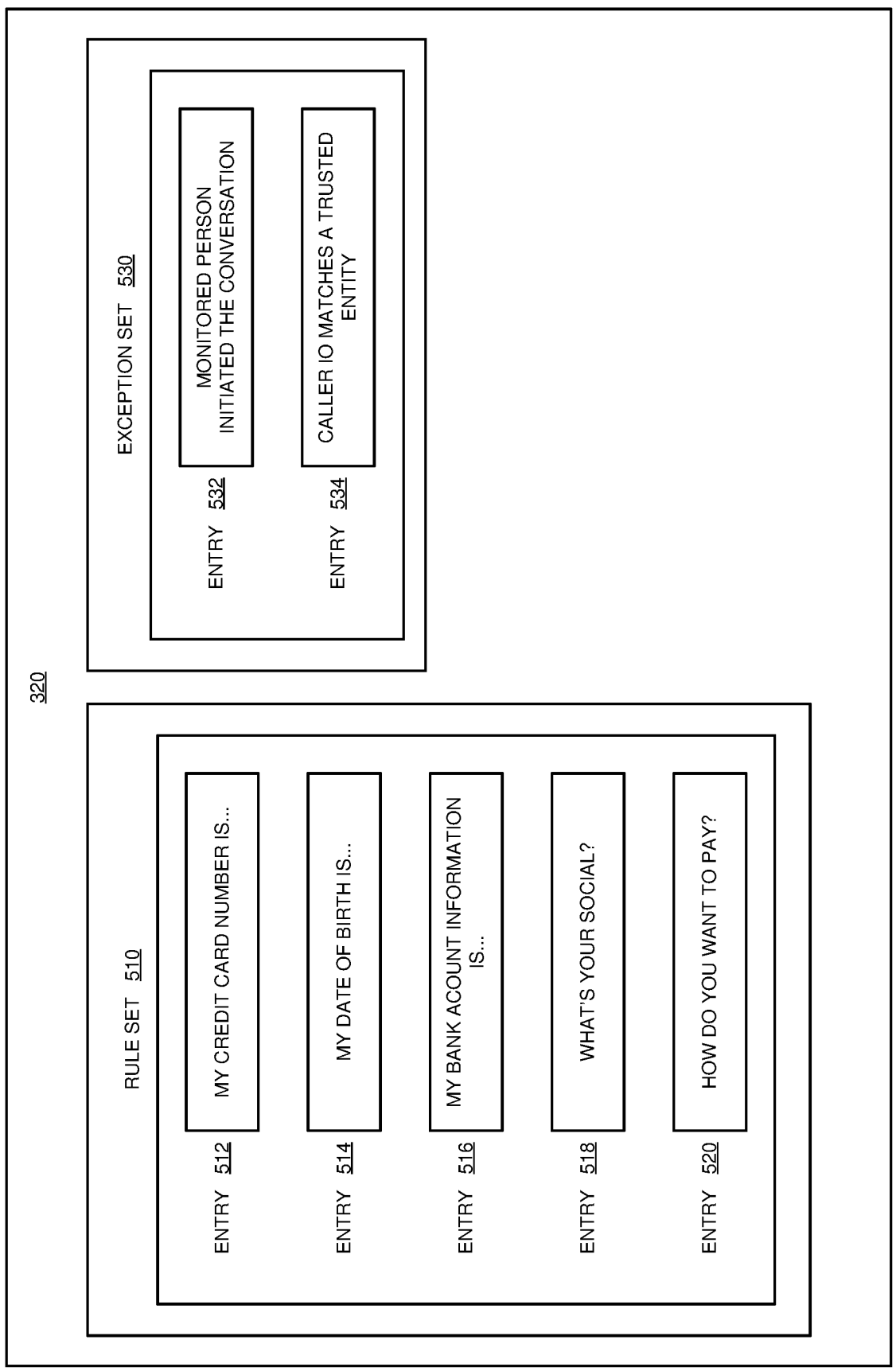
FIG. 5 depicts an example configuration for intercepting inadvertent conversational disclosure of personal information in accordance with an illustrative embodiment.

With reference to FIG. 5, this figure depicts an example configuration for intercepting inadvertent conversational disclosure of personal information in accordance with an illustrative embodiment. The example can be implemented using application 300 in FIG. 3.

In particular, FIG. 5 depicts example rule set 510 and example exception set 530, for a rule-based implementation of an interaction behavior model.

Rule set 510 includes entries 512, 514, 516, 518, and 520, each including a natural language pattern, or a natural language text that, if matched in an interaction of a protected party, could indicate that an adverse result is about to occur. For example, entry 512, "My credit card number is", is a natural language pattern indicating that the speaker is likely to complete the sentence by reciting credit card information. A protected party's reciting of credit card information could indicate that the protected party is making a purchase or providing personal information to another party that should not have this particular personal information.

Exception set 530 includes entries 532 and 534, natural language patterns that represents a circumstance in which a rule, although matching an interaction of a protected party, does not apply because an adverse result is unlikely to occur. For example, rule set 510 includes entry 514, "my date of birth is", because disclosing one's date of birth could result in the inappropriate disclosure of personal information if the protected party were interacting in a telephone conversation with a sales caller who had initiated the call. However, the same would not be the case if the protected party had initiated a call to make an appointment at a physician's office, where such information is both needed for medical records and protected from disclosure. As a result, entry 532 provides an example exception to rule 514: the protected party initiated the conversation. Entry 534 provides another example exception to rule 514: that the identification information for the second party to the conversation matches identification information for a trusted party.

Figure 6:
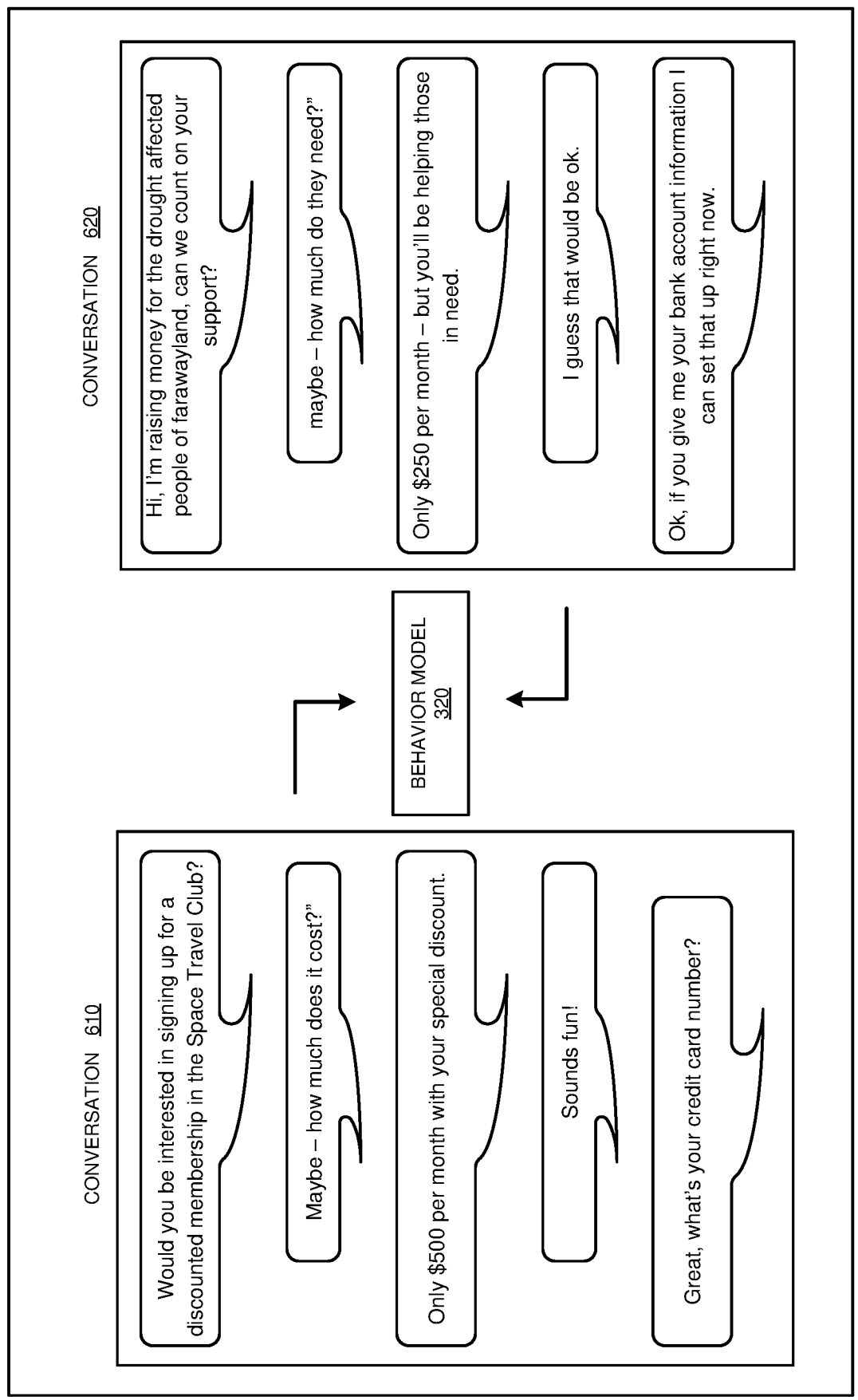
FIG. 6 depicts an example configuration for intercepting inadvertent conversational disclosure of personal information in accordance with an illustrative embodiment.

With reference to FIG. 6, this figure depicts an example configuration for intercepting inadvertent conversational disclosure of personal information in accordance with an illustrative embodiment. The example can be implemented using application 300 in FIG. 3. Interaction behavior model 320 is the same as interaction behavior model 320 in FIG. 3.

In particular, FIG. 6 depicts example training conversations 610 and 620, for use in training a learning interaction behavior model 320. Conversation 610 has a high probability of resulting in a protected party's disclosing credit card information, and conversation 620 has a high probability of resulting in a protected party's disclosing bank account information. Thus, if an interaction pattern is above a threshold value of matching conversation 610 or 620, the interaction pattern also has an above-threshold probability of a protected party's disclosing credit card or bank account information.

Figure 7:
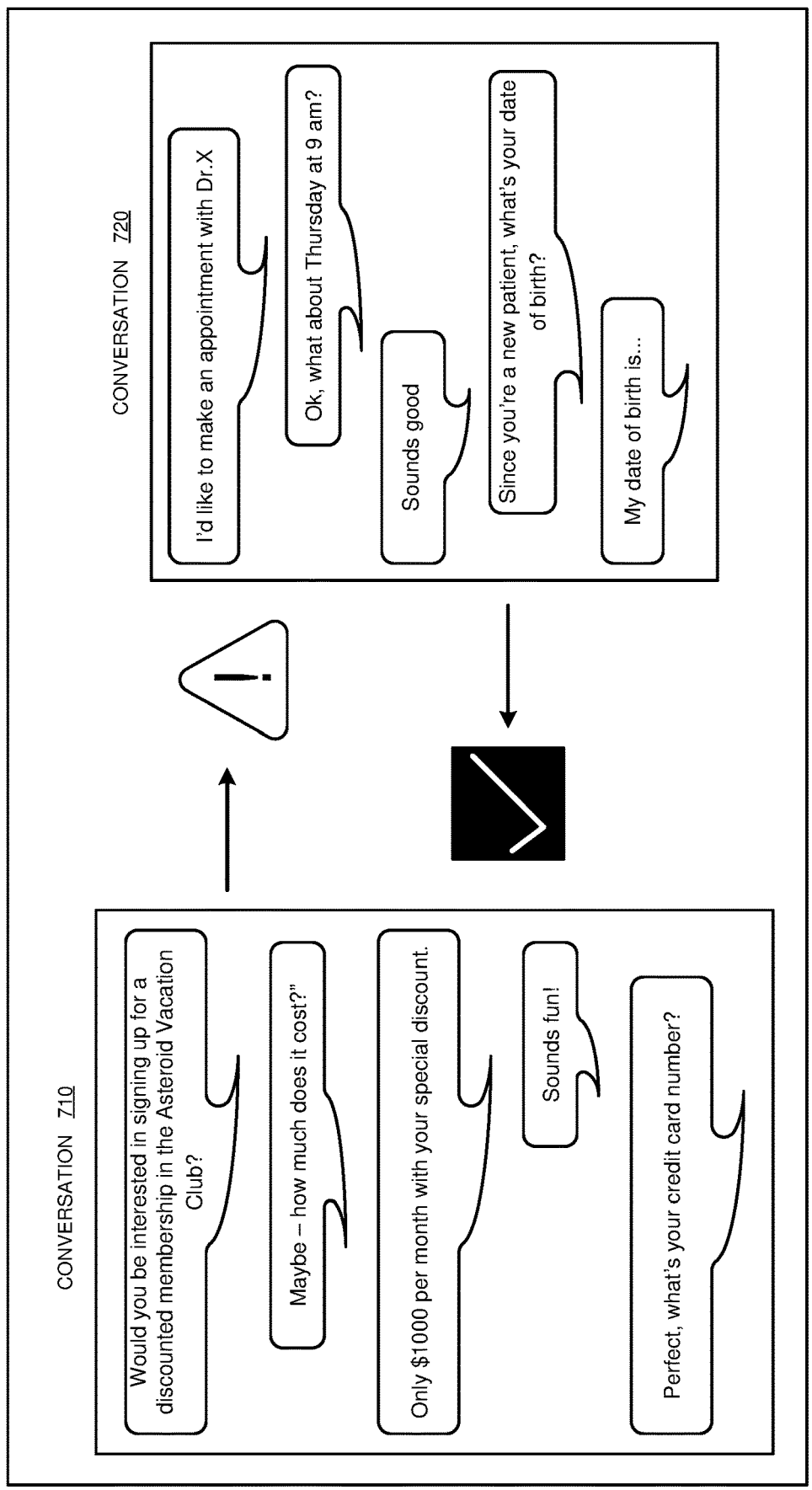
FIG. 7 depicts an example of intercepting inadvertent conversational disclosure of personal information in accordance with an illustrative embodiment.

With reference to FIG. 7, this figure depicts an example of intercepting inadvertent conversational disclosure of personal information in accordance with an illustrative embodiment. The example can be implemented using application 300 in FIG. 3.

In particular, FIG. 7 depicts example conversations 710 and 720. Application 300 determines that conversation 710 has a high probability of resulting in a protected party's disclosing credit card information, either because the interaction pattern corresponding to conversation 710 is above a threshold value of matching one or more rules, and no exceptions, in a rule-based interaction behavior model, or because conversation 710 is above a threshold value of matching one or more of a learning interaction behavior model's learned patterns that have a high probability of resulting in a protected party's disclosing bank account information. Thus, conversation 710 also has an above-threshold probability of a protected party's disclosing credit card or bank account information and application 300 generates an alert, intercepting the disclosure. However, application 300 determines that conversation 720 has a low probability of resulting in a protected party's disclosing date of birth information, either because the interaction pattern corresponding to conversation 720 is above a threshold value of matching one or more rules and exceptions, in a rule-based interaction behavior model, or because conversation 720 is below a threshold value of matching one or more of a learning interaction behavior model's learned patterns that have a high probability of resulting in a protected party's disclosing date of birth information to an untrusted party. Thus, conversation 720 also has an below-threshold probability of a protected party's disclosing date of birth information to an untrusted party and application 300 allows the disclosure to proceed without generating an alert or interception.

Figure 8:
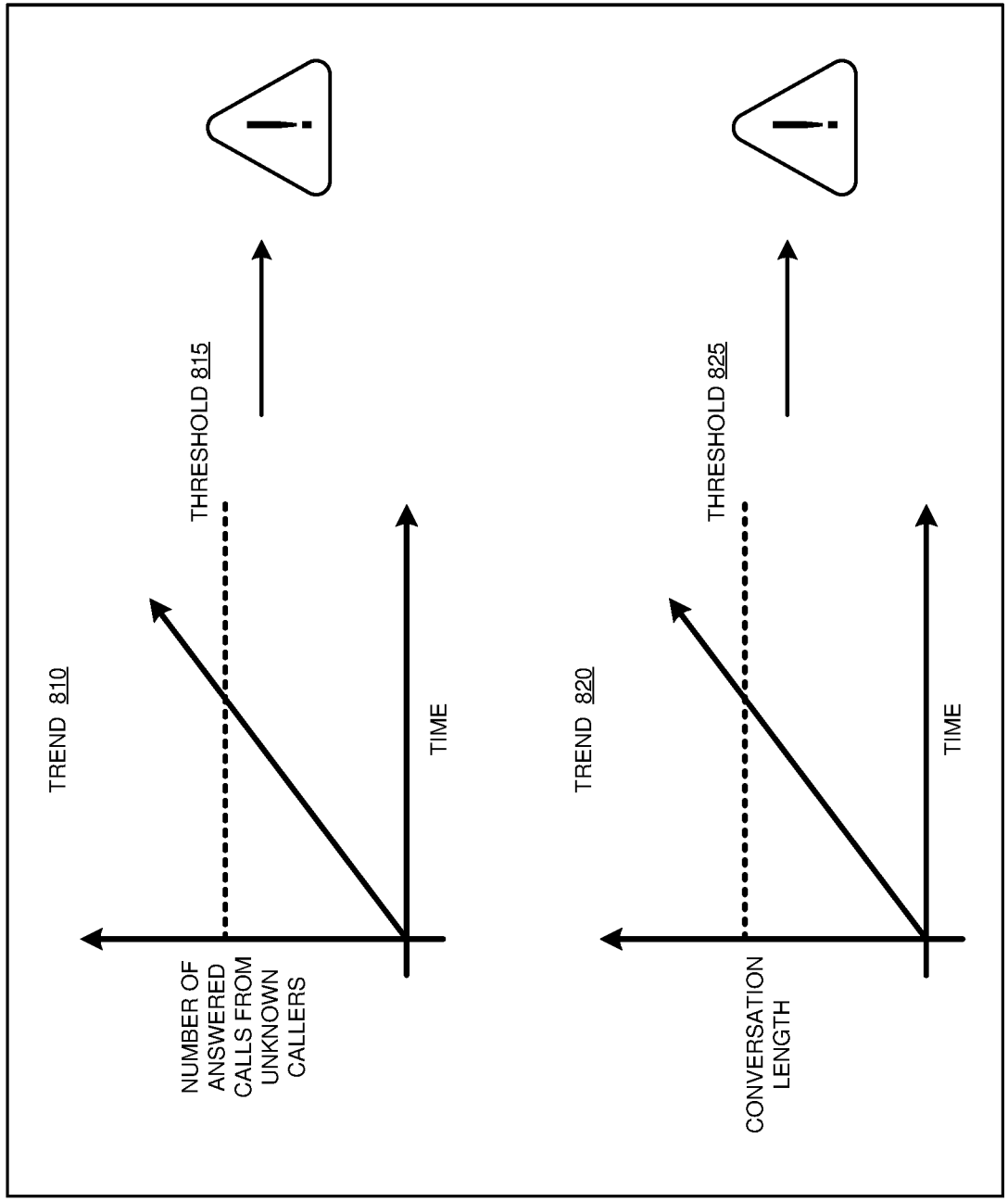
FIG. 8 depicts an example of trend monitoring in intercepting inadvertent conversational disclosure of personal information in accordance with an illustrative embodiment.

With reference to FIG. 8, this figure depicts an example of trend monitoring in intercepting inadvertent conversational disclosure of personal information in accordance with an illustrative embodiment. The example can be implemented using application 300 in FIG. 3.

As depicted, application 300 has used the interaction pattern, the interaction behavior model, and any predicted or actual adverse results to identify and monitor two trends in the protected party's behavior. Example trend 810 depicts a graph indicating that the number of telephone calls from unknown callers a protected party answers is increasing. When the number of answered telephone calls from unknown callers rises above threshold 815, application 300 reports the trend to another party responsible for the protected party, such as a caregiver or family member. Example trend 820 depicts a graph indicating that the lengths of a protected party's conversations with callers not a list of trusted callers are increasing. When the conversation length rises above threshold 825, application 300 reports the trend to another party responsible for the protected party, such as a caregiver or family member.

Figure 9:
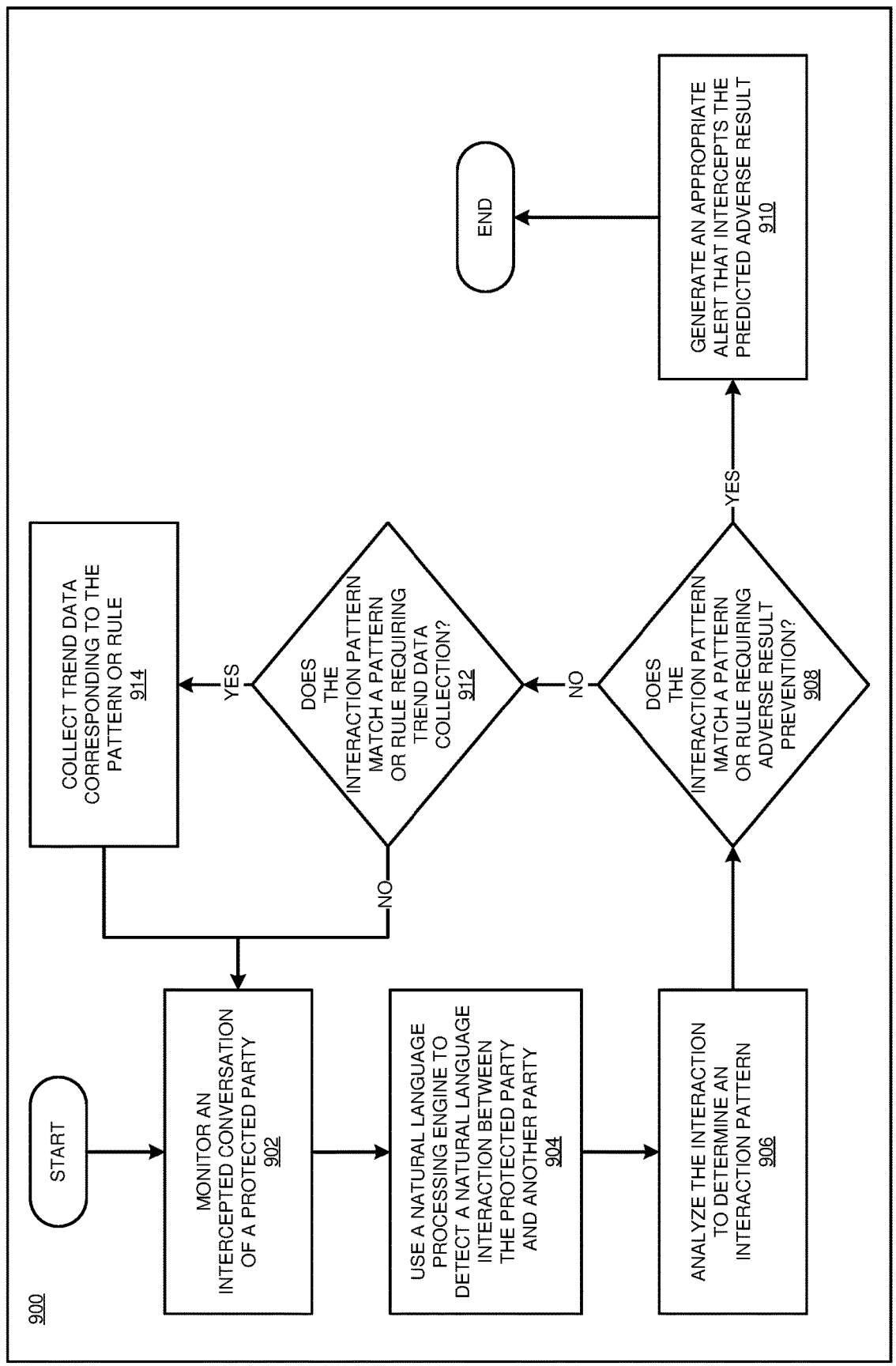
FIG. 9 depicts a flowchart of an example process for intercepting inadvertent conversational disclosure of personal information in accordance with an illustrative embodiment.

With reference to FIG. 9, this figure depicts a flowchart of an example process for intercepting inadvertent conversational disclosure of personal information in accordance with an illustrative embodiment. Process 900 can be implemented in application 300 in FIG. 3.

In block 902, the application monitors an intercepted conversation of a protected party. In block 904, the application uses a natural language processing engine to detect a natural language interaction between the protected party and another party. In block 906, the application analyzes the interaction to determine an interaction pattern. In block 908, the application checks whether the interaction pattern matches a pattern or rule requiring adverse result prevention. If yes ("YES" path of block 908), in block 910 the application generates an appropriate alert that intercepts the predicted adverse result, then ends. If not ("NO" path of block 908), in block 912 the application checks whether the interaction pattern matches a pattern or rule requiring trend data collection. If yes ("YES" path of block 912), in block 914 the application collects. trend data corresponding to the pattern or rule, then (also "NO" path of block 912) returns to block 902 to continue the monitoring.

Thus, a computer implemented method, system or apparatus, and computer program product are provided in the illustrative embodiments for intercepting inadvertent conversational disclosure of personal information and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   monitoring, by intercepting a network-mediated natural language communication of a protected party, the communication;
   detecting, within the monitored communication using a natural language processing engine, a natural language interaction including the protected party;
   analyzing, to determine an interaction pattern, the natural language interaction, the interaction pattern comprising data derived from the monitored communication, metadata of the protected party, and metadata of a recipient of the monitored communication;

predicting, using the interaction pattern and an interaction behavior model, a disclosure of personal information of the protected party, the disclosure predicted to be performed by the protected party during a future portion of the natural language interaction; and preventing, by muting a microphone of the protected party, a communication of the protected party, the communication predicted to contain the disclosure.

2. The computer-implemented method of claim 1, wherein the interaction behavior model comprises a set of rules, a rule in the set of rules comprising an interaction pattern predictive of an adverse result.

3. The computer-implemented method of claim 2, wherein the interaction behavior model further comprises a set of exceptions, an exception in the set of exceptions comprising an interaction pattern for which a rule in the set of rules does not apply.

4. The computer-implemented method of claim 1, wherein the interaction behavior model comprises a learning model, the learning model trained to recognize an interaction pattern predictive of the disclosure.

5. The computer-implemented method of claim 4, wherein the learning model is further trained using the interaction pattern and a previous disclosure of the protected party.

6. The computer-implemented method of claim 1, further comprising:

analyzing, to determine a second interaction pattern, a second natural language interaction including the protected party, the second natural language interaction excluding a party to the natural language interaction;

predicting, using the second interaction pattern and the interaction behavior model, a second disclosure of personal information of the protected party during a future portion of the second natural language interaction; and analyzing, to generate trend data of the protected party, the interaction pattern, the predicted disclosure, the second interaction pattern, and the second predicted disclosure.

7. The computer-implemented method of claim 6, further comprising:

generating, responsive to a portion of the trend data being outside of a threshold range of values, a trend alert.

8. A computer usable program product comprising one or more computer-readable storage devices, and program instructions stored on at least one of the one or more storage devices, the stored program instructions comprising:

program instructions to monitor, by intercepting a network-mediated natural language communication of a protected party, the communication;

program instructions to detect, within the monitored communication using a natural language processing engine, a natural language interaction including the protected party;

program instructions to analyze, to determine an interaction pattern, the natural language interaction, the interaction pattern comprising data derived from the monitored communication, metadata of the protected party, and metadata of a recipient of the monitored communication;

program instructions to predict, using the interaction pattern and an interaction behavior model, a disclosure of personal information of the protected party, the disclosure predicted to be performed by the protected party during a future portion of the natural language interaction; and program instructions to prevent, by muting a microphone of the protected party, a communication of the protected party, the communication predicted to contain the disclosure.

9. The computer usable program product of claim 8, wherein the interaction behavior model comprises a set of rules, a rule in the set of rules comprising an interaction pattern predictive of an adverse result.

10. The computer usable program product of claim 9, wherein the interaction behavior model further comprises a set of exceptions, an exception in the set of exceptions comprising an interaction pattern for which a rule in the set of rules does not apply.

11. The computer usable program product of claim 8, wherein the interaction behavior model comprises a learning model, the learning model trained to recognize an interaction pattern predictive of the disclosure.

12. The computer usable program product of claim 11, wherein the learning model is further trained using the interaction pattern and a previous disclosure of the protected party.

13. The computer usable program product of claim 8, further comprising:

program instructions to analyze, to determine a second interaction pattern, a second natural language interaction including the protected party, the second natural language interaction excluding a party to the natural language interaction;

program instructions to predict, using the second interaction pattern and the interaction behavior model, a second disclosure of personal information of the protected party during a future portion of the second natural language interaction; and program instructions to analyze, to generate trend data of the protected party, the interaction pattern, the predicted disclosure, the second interaction pattern, and the second predicted disclosure.

14. The computer usable program product of claim 13, further comprising:

program instructions to generate, responsive to a portion of the trend data being outside of a threshold range of values, a trend alert.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to monitor, by intercepting a network-mediated natural language communication of a protected party, the communication;

program instructions to detect, within the monitored communication using a natural language processing engine, a natural language interaction including the protected party;

program instructions to analyze, to determine an interaction pattern, the natural language interaction, the interaction pattern comprising data derived from the monitored communication, metadata of the protected party, and metadata of a recipient of the monitored communication;

program instructions to predict, using the interaction pattern and an interaction behavior model, a disclosure of personal information of the protected party, the disclosure predicted to be performed by the protected party during a future portion of the natural language interaction; and program instructions to prevent, by muting a microphone of the protected party, a communication of the protected party, the communication predicted to contain the disclosure.

18. The computer system of claim 17, wherein the interaction behavior model comprises a set of rules, a rule in the set of rules comprising an interaction pattern predictive of an adverse result.

* * * * *